(12) United States Patent  (10) Patent No.: US 11,775,960 B2
Johnson et al.  (45) Date of Patent: *Oct. 3, 2023

(54) SYSTEMS AND METHODS FOR PROVIDING POWER TO A MULTI-PURPOSE TRANSACTION CARD

(71) Applicant: Capital One Services, LLC, McLean, VA (US)

(72) Inventors: Molly Johnson, Alexandria, VA (US); James Zarakas, Centreville, VA (US); Adam Vukich, Springfield, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,673

(22) Filed: Nov. 4, 2022

(65) Prior Publication Data

US 2023/0118529 A1  Apr. 20, 2023

Related U.S. Application Data

(63) Continuation of application No. 17/305,678, filed on Jul. 13, 2021, now Pat. No. 11,494,759, which is a continuation of application No. 16/876,771, filed on May 18, 2020, now Pat. No. 11,068,882.

(51) Int. Cl.
*G06Q 20/34* (2012.01)
*G06K 19/077* (2006.01)

(52) U.S. Cl.
CPC ..... *G06Q 20/352* (2013.01); *G06K 19/07777* (2013.01); *G06Q 20/341* (2013.01)

(58) Field of Classification Search
None
See application file for complete search history.

(56) References Cited

U.S. PATENT DOCUMENTS

| | | | |
|---|---|---|---|
| 10,198,726 | B2 | 2/2019 | De La Cropte De Chanterac et al. |
| 10,218,412 | B1 | 2/2019 | Koeppel et al. |
| 11,068,882 | B1 * | 7/2021 | Johnson ............... G06Q 20/341 |
| 11,494,759 | B2 * | 11/2022 | Johnson ............ G06K 19/0702 |
| 2013/0084803 | A1 | 4/2013 | Hall et al. |
| 2013/0144793 | A1 | 6/2013 | Royston |

(Continued)

FOREIGN PATENT DOCUMENTS

EP  3564885 A1  11/2019

OTHER PUBLICATIONS

International Search Report and Written Opinion for Application No. PCT/US2021/032720, dated Sep. 9, 2019, 9 pages.

*Primary Examiner* — Kristy A Haupt
(74) *Attorney, Agent, or Firm* — Harrity & Harrity, LLP

(57) ABSTRACT

A controller of a transaction card may cause the transaction card to be in a first state. The transaction card may include a battery and at least one other component. In the first state, the battery does not provide power to the at least one other component of the transaction card. The transaction card may receive a signal from a near-field communication (NFC) device and may cause the transaction card to be in a second state based on receiving the signal. In the second state, the battery provides power to the at least one other component of the transaction card. The transaction card may perform a transaction based on the transaction card being in the second state.

20 Claims, 10 Drawing Sheets

(56) References Cited

U.S. PATENT DOCUMENTS

| | | |
|---|---|---|
| 2014/0138447 A1 | 5/2014 | Goldman et al. |
| 2015/0170014 A1 | 6/2015 | Olson et al. |
| 2017/0331524 A1 | 11/2017 | Aranyosi et al. |
| 2019/0190568 A1 | 6/2019 | Koeppel et al. |

\* cited by examiner

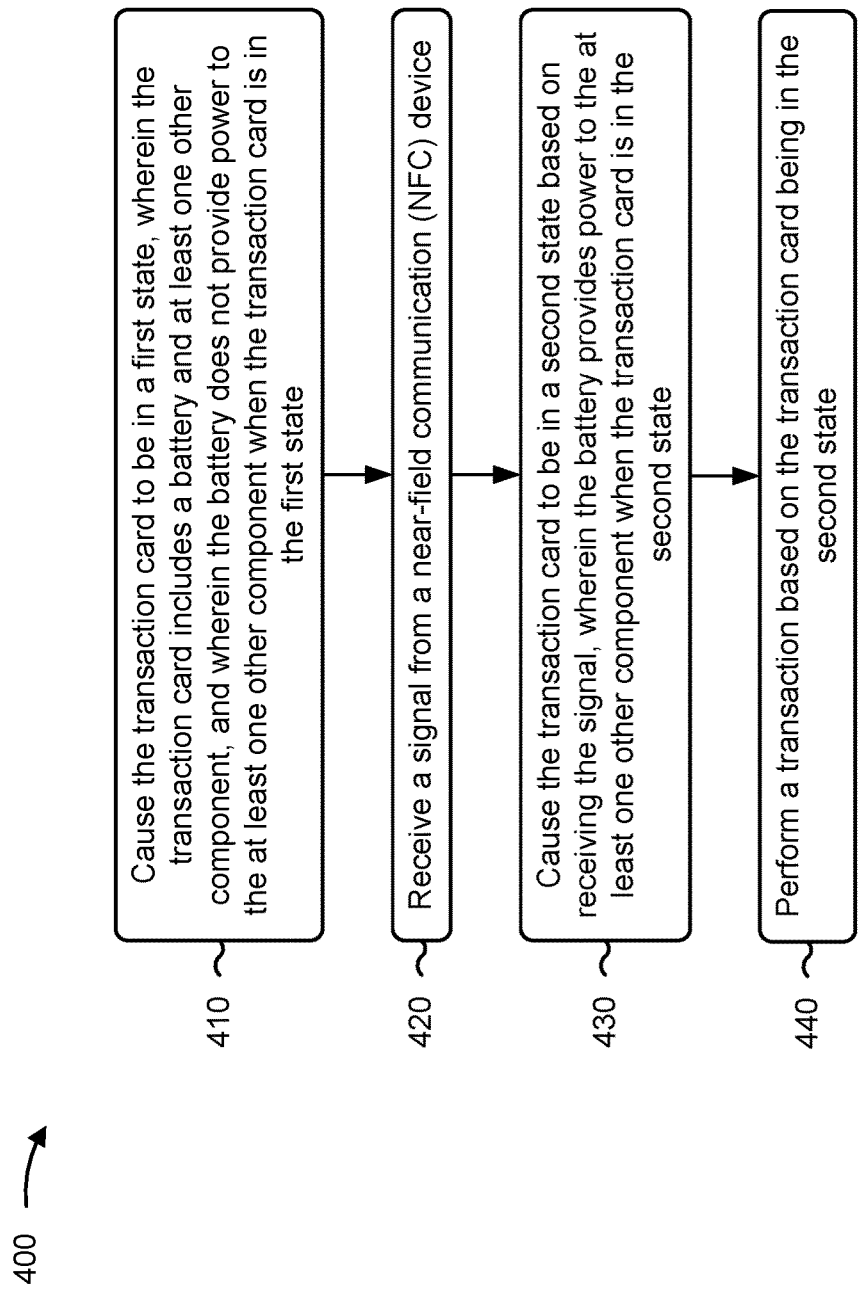

SYSTEMS AND METHODS FOR PROVIDING POWER TO A MULTI-PURPOSE TRANSACTION CARD

RELATED APPLICATION

This application is a continuation of U.S. patent application Ser. No. 17/305,678, filed Jul. 13, 2021 (now U.S. Pat. No. 11,494,759), which is a continuation of U.S. patent application Ser. No. 16/876,771, filed May 18, 2020 (now U.S. Pat. No. 11,068,882), the contents of which are incorporated herein by reference in their entireties.

BACKGROUND

A transaction card (e.g., a credit card, a debit card, a gift card, an automated teller machine (ATM) card, a rewards card or a client loyalty card, and/or the like) and/or a device (e.g., a smart transaction card, a smartphone, and/or the like) may be used in a transaction to pay for a product or service at a transaction terminal (e.g., point of sale (PoS) terminal) of an individual or a business engaged in the sale of goods or services. The transaction card may include an integrated circuit (IC) chip to improve security with respect to use of the transaction card.

SUMMARY

According to some implementations, a method may include causing, by a controller of a transaction card, the transaction card to be in a first state, wherein the transaction card includes a battery and at least one other component, and wherein the battery does not provide power to the at least one other component when the transaction card is in the first state; receiving, by the transaction card, a signal from a near-field communication (NFC) device; causing, by the controller, the transaction card to be in a second state based on receiving the signal, wherein the battery provides power to the at least one other component when the transaction card is in the second state; and performing, by the transaction card, a transaction based on the transaction card being in the second state.

According to some implementations, a transaction card may include one or more memories; and one or more processors, communicatively coupled to the one or more memories, configured to: receive, when the transaction card is in a first state, a first signal from a near-field communication device, wherein a power source of the transaction card does not supply power to a set of components of the transaction card when the transaction card is in the first state; cause the transaction card to be in a second state for a predetermined time period based on the first signal, wherein the power source provides power to the set of components when the transaction card is in the second state; and perform a transaction based on the transaction card being in the second state.

According to some implementations, a non-transitory computer-readable medium may store one or more instructions. The one or more instructions, when executed by one or more processors of a transaction card, may cause the one or more processors to: receive, when the transaction card is in a first state, a first signal from a near-field communication device, wherein the transaction card includes a power source and one or more other components, wherein the power source of the transaction card does not supply power to the one or more other components when the transaction card is in the first state; transmit a second signal to at least one of the power source or the one or more other components to cause the transaction card to be in a second state based on the first signal, wherein the power source provides power to the one or more other components when the transaction card is in the second state; and perform a transaction based on the transaction card being in the second state.

BRIEF DESCRIPTION OF THE DRAWINGS

FIG. 4 is a flowchart of an example process for providing power to a multi-purpose transaction card.

DETAILED DESCRIPTION

Figure 1A:
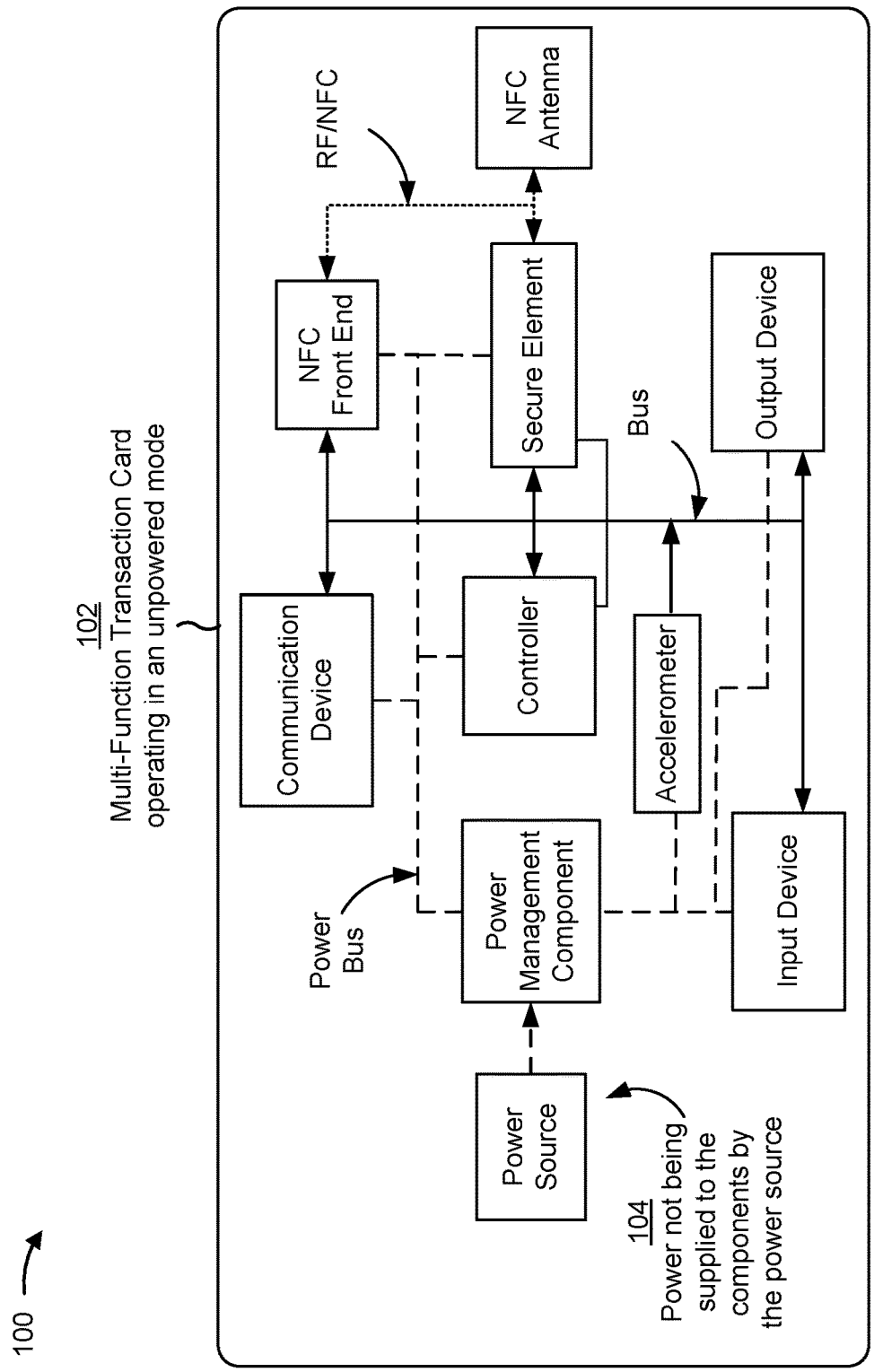
FIGS. 1A-1G are diagrams of one or more example implementations described herein.

The following detailed description of example implementations refers to the accompanying drawings. The same reference numbers in different drawings may identify the same or similar elements.

In some instances, a transaction card (e.g., a credit card, a debit card, a gift card, an automated teller machine (ATM) card, a rewards card or a client loyalty card, and/or the like) may include an electronic circuit with components that are powered by a power source internal to the transaction card (e.g., a battery and/or the like). For example, an internal power source may provide power to one or more communication interfaces, one or more processors, one or more user interfaces, one or more memories, one or more storage components, and/or the like of the transaction card.

The transaction card may include a secure element capable of securely hosting an application and/or an operating system, storing confidential data associated with the application and/or operating system, and/or storing cryptographic data (e.g., a cryptographic key and/or the like) associated with the application and/or operating system. For example, a secure element may host an application for performing a transaction and may store credentials and/or cryptographic keys for authenticating the transaction. A secure element may assist with performing different types of transactions, such as financial transactions (e.g., contactless transactions) using different payment methods, user identification, access, transit, ticketing, and/or the like. To perform different types of transactions, the transaction card may load different applications onto the secure element and may execute a particular application to perform a particular type of transaction.

The transaction card may use power obtained from the internal power source to load an application onto the secure element, unload an application from the secure element, configure an application for performing a transaction, and/or the like.

To conserve power, a transaction card having an internal power source may include a component for determining when the internal power source is to provide power to one or more components of the transaction card. For example, the transaction card may utilize an accelerometer to detect a movement of the transaction card. The internal power source may provide power to the transaction card based on a detection of the movement.

By utilizing a component to determine when the internal power source is to provide power to one or more components of the transaction card, an amount of power provided by the internal power source can be reduced relative to an amount of power provided by an internal power source that constantly provides power to the components of the transaction card. However, to enable the component to be able to determine when the internal power source is to provide power to the transaction card, the internal power source must constantly provide power to the component, thereby reducing the amount of power available to be provided to the components of the transaction card and/or reducing an amount of time before the internal power source is required to be recharged.

Some implementations described herein permit a transaction card to switch between an unpowered state and a powered state based on an NFC signal received from an NFC device. In this way, an internal power source may selectively provide power to the transaction card based on an event, without having to constantly provide power to a component used to determine when the internal power source is to provide power to other components of the transaction card. In this way, the amount of power available to be provided to the components of the transaction card and/or an amount of time before the internal power source is required to be recharged is increased.

By increasing the power available to be provided to the components of the transaction card and/or the amount of time before the internal power source is required to be recharged, an internal power source of a transaction card can maintain a charge between transactions at transaction terminals, and thus ensure that the transaction card has full functionality between the transactions at the transaction terminals. As such, communication resources, processing resources, and/or the like, that may otherwise be used to access or utilize a function of the transaction card can be conserved. For example, if a user device or a transaction terminal is to attempt to access a payment token from the transaction card, some implementations described herein can ensure that the transaction card has power to provide the payment token to the user device or the transaction terminal. In such a case, communication resources and/or processing resources of the user device and/or the transaction terminal can be conserved by ensuring that the transaction card has enough power to provide the payment token and avoiding loss of functionality due to a lack of charging the internal power source between transactions at transaction terminals.

FIGS. 1A-1G are diagrams of one or more example implementations 100 described herein. As shown in FIG. 1A, a multi-function transaction card that is capable of interacting with a transaction terminal to submit payments and/or interacting with a transaction card to receive payments.

As shown in FIG. 1A, the multi-function transaction card may include, among other components (e.g., as described elsewhere herein), a power source internal to the multi-function transaction card. The power source may be configured to selectively provide power to components of the multi-function transaction card based on an operating mode or state of the multi-function transaction card. In some implementations, the operating mode may be an unpowered mode and/or a powered mode of operation.

For example, as shown in FIG. 1A, and by reference number 102, the multi-function transaction card may operate in an unpowered mode. As shown by reference number 104, the power source may not provide power to the components of the multi-function transaction card based on the multi-function transaction card operating in the unpowered mode.

Figure 1B:
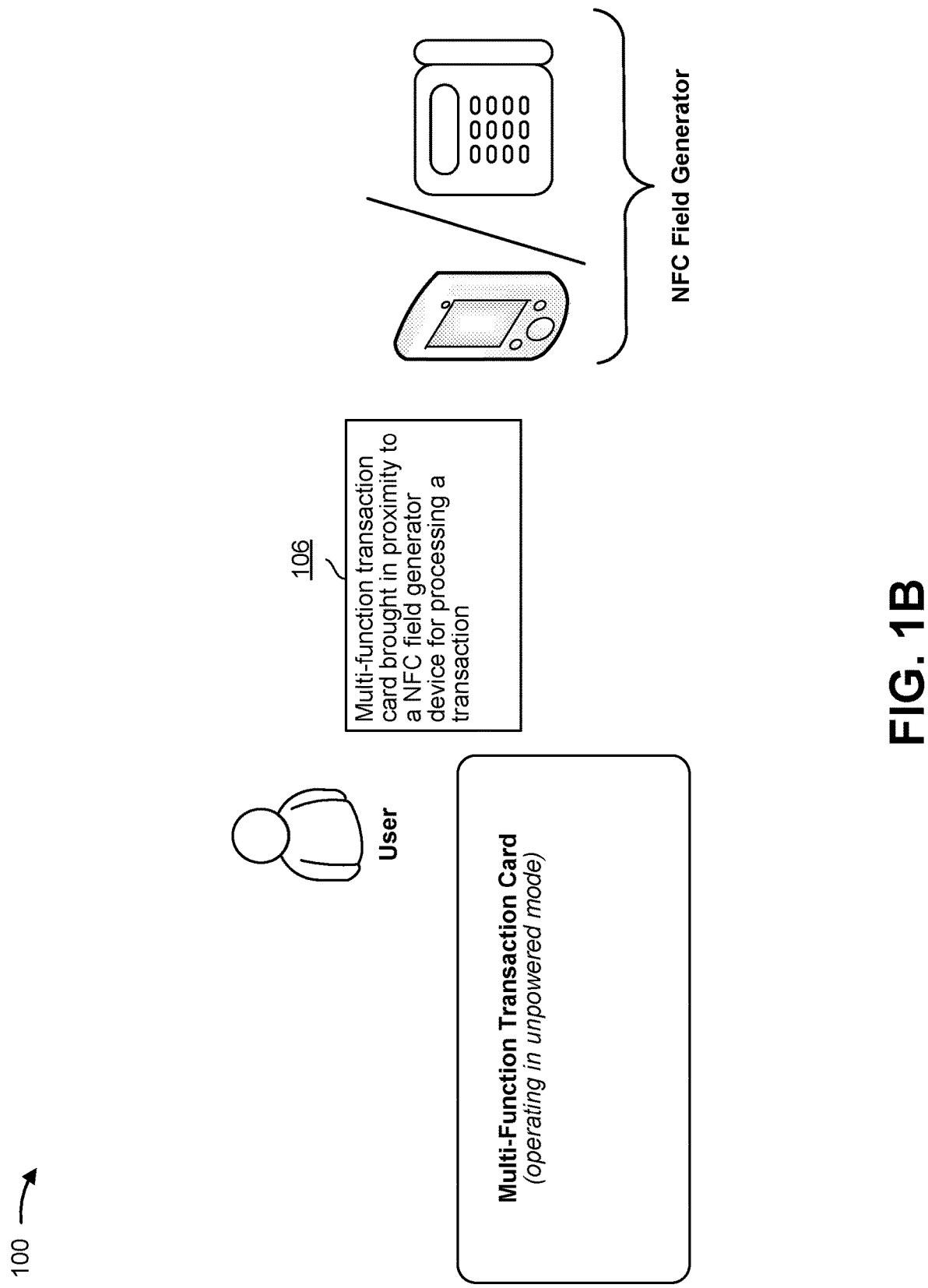

In some implementations, while operating in the unpowered mode, a user may desire to utilize the multi-function transaction card to conduct a transaction (e.g., to purchase of a good and/or service). As shown in FIG. 1B, and by reference number 106, to conduct the transaction, the user may cause the multi-function transaction card to be in proximity to (e.g., within about 4.0 cm) a near-field communication (NFC) field generator, such as, for example, a point of sale (PoS) transaction terminal, a mobile device, a smart phone, and/or the like.

Figure 1C:
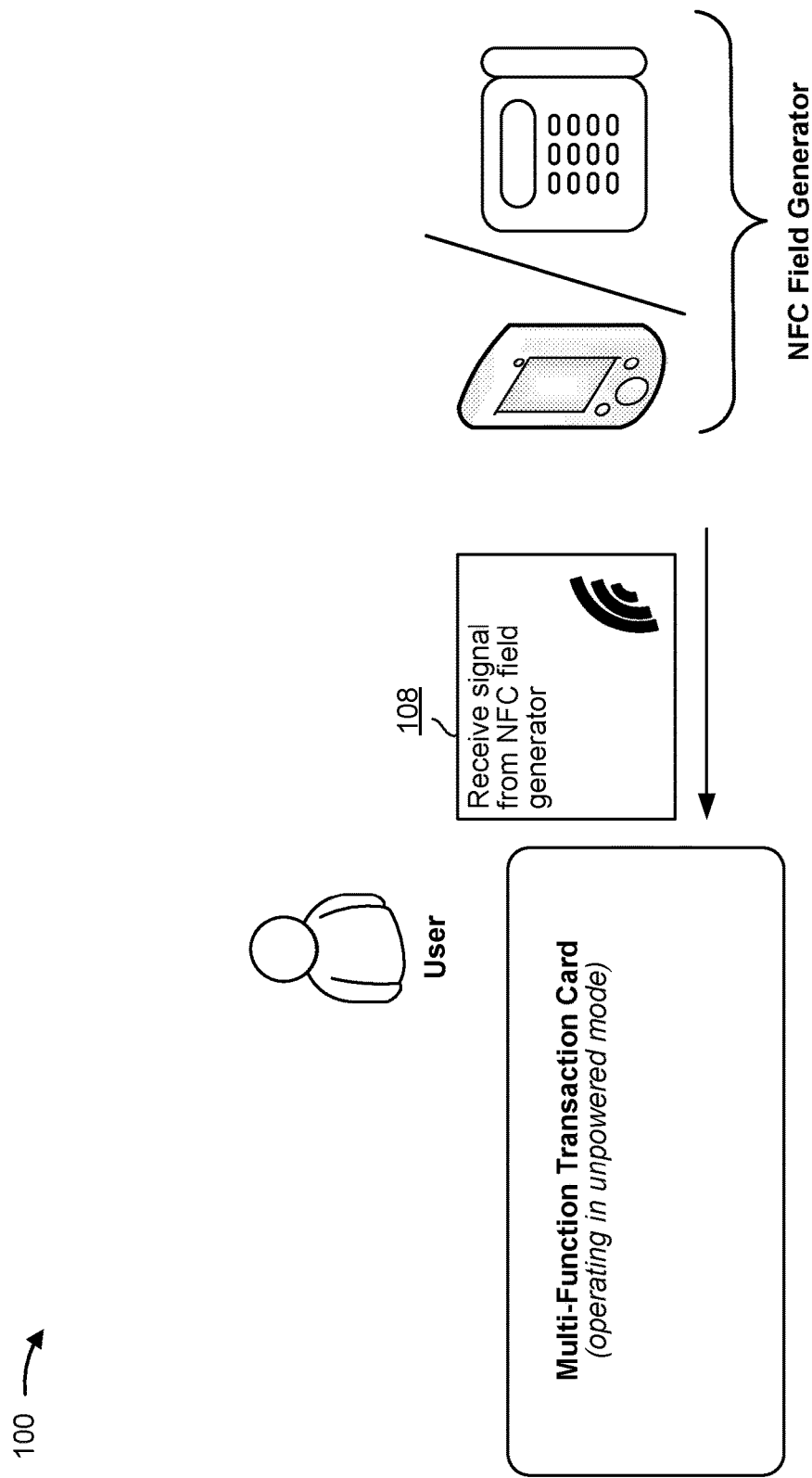

In some implementations, the multi-function transaction card may transition from operating in the unpowered mode to the powered mode based on the multi-function transaction card receiving an NFC signal from the NFC field generator in connection with conducting a transaction. For example, as shown in FIG. 1C, and by reference number 108, the multi-function transaction card may receive a signal from the NFC field generator based on the multi-function transaction card being in proximity to the NFC field generator.

Figure 1D:
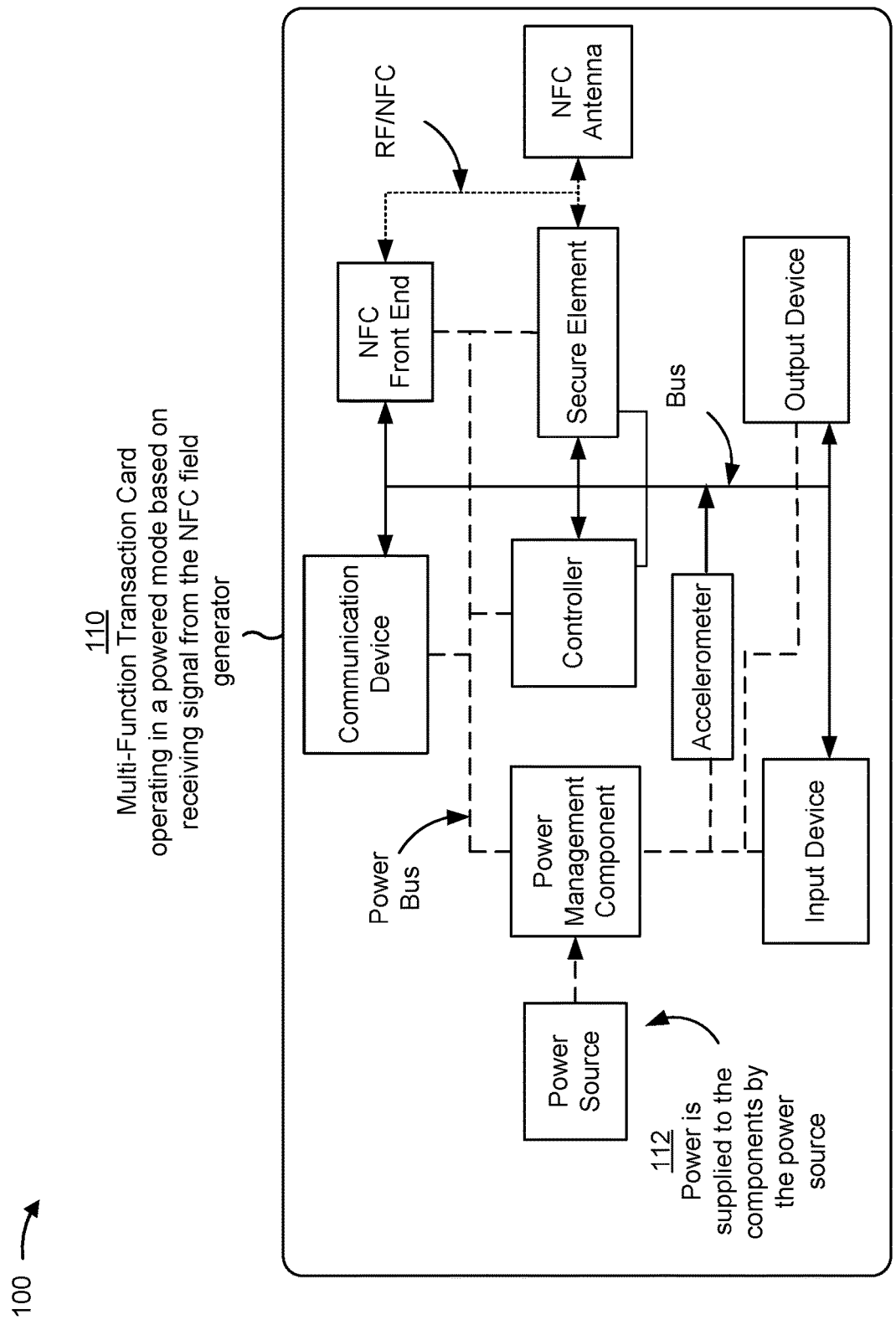

In some implementations, as shown in FIG. 1D, and by reference number 110, the multi-function transaction card may cause the multi-function transaction card to operate in the powered mode based on the signal received from the NFC field generator. For example, the multi-function transaction card may harvest energy from the NFC signal generated by the NFC field generator. The multi-function transaction card may use the harvested energy to transmit a signal (e.g., a hardware interrupt signal) to the power source to cause multi-function transaction card to operate in the powered mode. As shown in FIG. 1D, and by reference number 112, the power source may provide power to the components of the multi-function transaction card based on the multi-function transaction card operating in the powered mode.

In some implementations, the multi-function transaction card may operate in the powered mode based on data obtained by an accelerometer included in the multi-function transaction card. For example, a user may provide an input to the multi-function transaction card via an input component embedded in a card body of the multi-function transaction card, such as a button, a switch, a touch sensor, and/or the like. The multi-function transaction card may operate in a minimal power mode based on the input. The power source may provide power to the accelerometer based on the multi-function transaction card being in the minimal power mode. The accelerometer may utilize the power provided by the power source to obtain data indicating a movement of the multi-function transaction card. The multi-function transaction card may detect the movement based on the data and may begin operating in the powered mode based on detecting the movement.

Figure 1E:
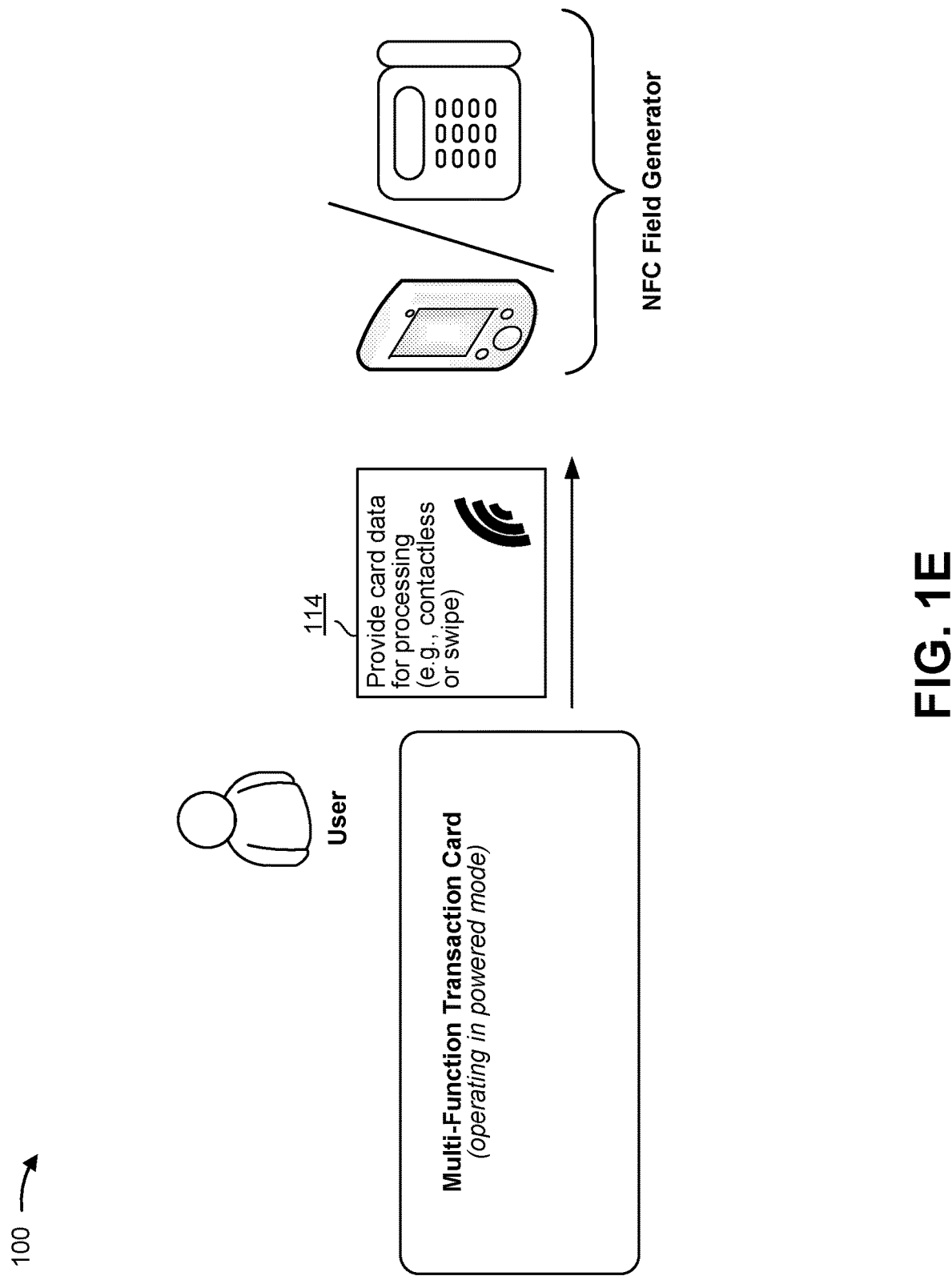

In some implementations, the multi-function transaction card may use power provided by the power source conduct a transaction based on the multi-function transaction card operating in the powered mode. For example, as shown in FIG. 1E, and by reference number 114, the multi-function transaction card may use power obtained from the power source to provide card data to the NFC field generator.

In some implementations, the multi-function transaction card may use power provided by the power source to perform one or more operations associated with a transaction based on the multi-function transaction card being in the powered mode. For example, the multi-function transaction card may use power provided by the power source to monitor transaction data, to communicate between the controller and the secure element, to enhance a speed and/or range of the transaction, to perform fraud monitoring, to perform transaction analytics, to load an application associated with the transaction into a memory of the secure element, to unload an application not associated with the transaction from the memory of the secure element, to configure an application for performing the transaction, and/or another operation associated with a transaction.

Additionally, and/or alternatively, the multi-function transaction card may use power provided by the power source to perform one or more other types of operations based on the multi-function transaction card being in the powered mode. For example, the NFC field generator may be a user device (e.g., a mobile device, a computer, a laptop, a smart phone, and/or the like) and the user may bring the multi-function transaction card in proximity to the NFC field generator to initialize the multi-function transaction card, to transfer user data from the user device to the multi-function transaction card, to perform an update operation to update an application stored on a memory of the secure element, to transmit transaction data to the user device, to synchronize data between the multi-function transaction card and the user device, and/or another type of operation.

In some implementations, the multi-function transaction card may perform an operation for providing energy to the power source. For example, the power source may include a rechargeable battery. The multi-function transaction card may harvest energy from the signal transmitted by the NFC field generator and may use the harvested energy to recharge the rechargeable battery.

In some implementations, the multi-function transaction card may operate in the powered mode based on the one or more inputs. For example, a user may provide, to the multi-function transaction card (e.g., via one or more input components embedded in a card body of the multi-function transaction card, such as one or more buttons, switches, touch sensors, and/or the like), one or more inputs (e.g., information regarding a transaction) to initialize and/or enable the functionality of the multi-function transaction card. The multi-function transaction card may operate in the powered mode based on the one or more inputs.

Figure 1F:
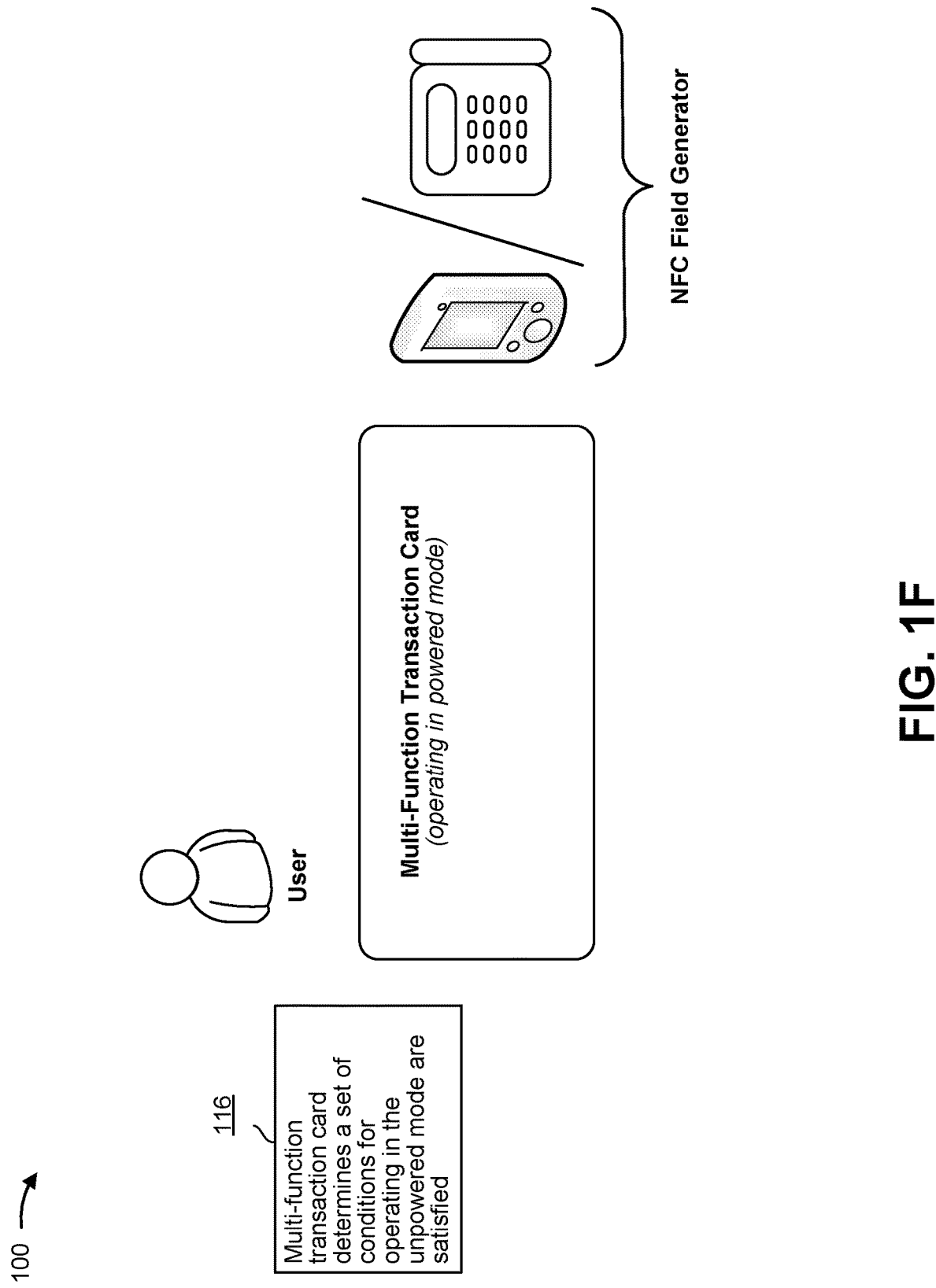

In some implementations, as shown in FIG. 1F, and by reference number 116, the multi-function transaction card may stop operating in the powered mode and begin operating in the unpowered mode based on a set of conditions for operating in the unpowered mode being satisfied.

In some implementations, the set of conditions may include a condition associated with a completion of the transaction. For example, the NFC field generator may transmit a signal to the multi-function transaction card indicating that the transaction and/or the other operation has been successfully conducted. The multi-function transaction card may receive the signal (e.g., via the NFC antenna) and may determine to stop operating in the powered mode and to begin operating in the unpowered mode based on the signal indicating that the transaction has been successfully completed.

In some implementations, the set of conditions may include a condition related to an expiration of a time period. The time period may start at a time that the multi-function transaction card begins operating in the powered mode and may correspond to a predetermined period of time (e.g., 30 seconds, 1 minute, 2 minutes, and/or another period of time) for which the multi-function transaction card is to remain operating in the powered mode. For example, the multi-function transaction card may initialize a timer based on the multi-function transaction card operating in the powered mode. The multi-function transaction card may determine an expiration of the time period based on the timer (e.g., based on a value of the timer being equal to 0 and/or another value). The multi-function transaction card may stop operating in the powered mode and begin operating in the unpowered mode based on the expiration of the time period.

In some implementations, the multi-function transaction card may determine that the transaction and/or other operation is complete, and the multi-function transaction card may stop operating in the powered mode and begin operating in the unpowered mode prior to the expiration of the time period. For example, prior to the expiration of the time period, the NFC field generator may transmit a signal, to the multi-function transaction card, indicating that a transaction and/or an update operation is complete and/or that the multi-function transaction card is to begin operating in the unpowered mode. The multi-function transaction card may begin operating in the unpowered mode prior to the expiration of the time period based on the signal.

In other implementations, the multi-function transaction card may determine that the transaction and/or the other operation is not complete, and the multi-function transaction card may continue to operate in the powered mode after the expiration of the time period. For example, the multi-function transaction card may determine that the multi-function transaction card has not received a signal indicating that the transaction and/or the other operation is complete prior to the expiration of the time period. The multi-function transaction card may continue operating in the powered mode after the expiration of the time period based on the multi-function transaction card not receiving the signal prior to the expiration of the time period. The multi-function transaction card may subsequently receive a signal from the NFC field generator indicating that the transaction and/or the other operation is complete and may begin operating in the unpowered mode based on the signal.

In some implementations, the multi-function transaction card may continue operating in the unpowered mode after an expiration of a time period based on a signal received from the NFC field generator prior to the expiration of the time period. For example, the multi-function transaction card may perform an update operation with a user device to update an application stored in a memory of the multi-function transaction card. The user device may determine that the update operation will take longer than the time period and may transmit a first signal to the multi-function transaction card indicating that the multi-function transaction card is not to begin operating in the unpowered mode upon an expiration of the time period and/or that the multi-function transaction card is to continue operating in the powered mode until the multi-function transaction card receives a second signal from the user device indicating that the update operation is complete. The multi-function transaction card may continue operating in the powered mode after expiration of the time period based on the first signal. Subsequently, the multi-function transaction card may receive the second signal from the user device and may begin operating in the unpowered mode.

Figure 1G:
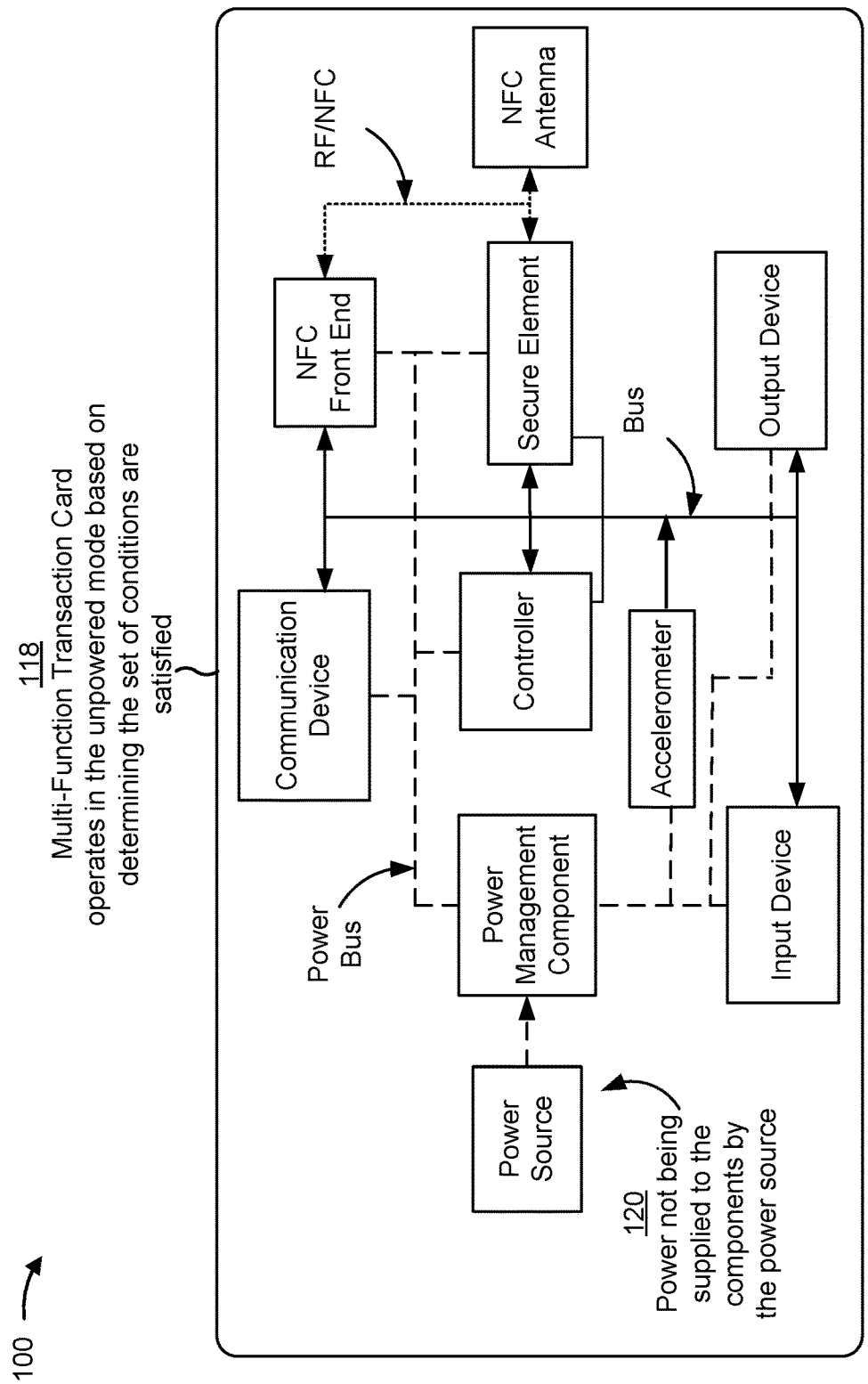

In some implementations, as shown in FIG. 1G, and by reference number 120, based on determining that the set of conditions are satisfied, the multi-function transaction card may operate in the unpowered mode. The power source may not provide power to the components of the multi-function transaction card based on the multi-function transaction card operating in the unpowered mode.

Some implementations described herein may allow the power source to provide power to the components of the multi-function transaction card for about 12-13 months before the power source needs to be recharged. In contrast, a multi-function transaction card utilizing a component that requires a constant supply of power to determine when to begin operating in a powered mode may be able to supply power to the components of the multi-function transaction card for about 2-3 weeks before the power source needs to be recharged. In this way, some implementations described herein may improve operation of the multi-function transaction card and conserve resources that would otherwise be wasted by a failed transaction (e.g., where the multi-function transaction card begins a transaction utilizing power supplied by the internal power source but runs out of power before the transaction is completed).

As indicated above, FIGS. 1A-1G are provided as one or more examples. Other examples may differ from what is described with regard to FIGS. 1A-1G.

Figure 2:
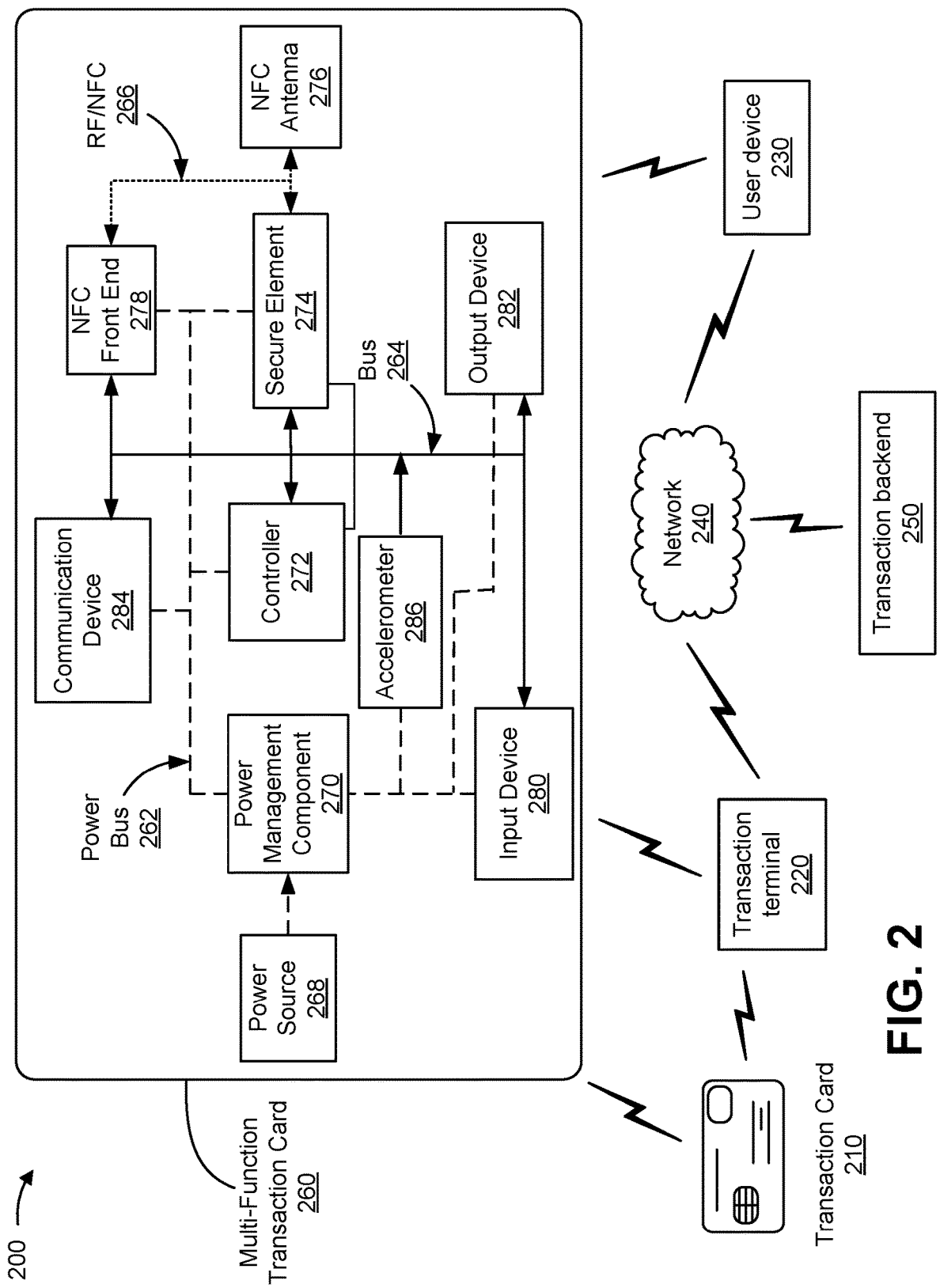
FIG. 2 is a diagram of an example environment in which systems and/or methods described herein may be implemented.

FIG. 2 is a diagram of an example environment 200 in which systems, devices, and/or methods, described herein, may be implemented. As shown in FIG. 2, environment 200 may include a transaction card 210, a transaction terminal 220, a user device 230, a network 240, a transaction backend 250, and a multi-function transaction card 260. Devices of environment 200 may interconnect via wired connections, wireless connections, or a combination of wired and wireless connections.

Transaction card 210 includes a transaction card capable of storing and/or communicating data for a PoS transaction with transaction terminal 220 and/or multi-function transaction card 260. For example, transaction card 210 may store or communicate data including account information (e.g., an account identifier, a cardholder identifier, etc.), expiration information of transaction card 210, banking information, transaction information (e.g., a payment token), and/or the like. For example, to store or communicate the data, transaction card 210 may include a magnetic stripe and/or an IC chip (e.g., an EMV chip and/or the like).

In some implementations, transaction card 210 may include an antenna to communicate data associated with transaction card 210. The antenna may be a passive radio frequency (RF) antenna, an active RF antenna, and/or a battery-assisted RF antenna. In some implementations, transaction card 210 may be a smart transaction card, capable of communicating wirelessly (e.g., via Bluetooth®, Bluetooth Low Energy (BLE), near-field communication (NFC), and/or the like) with a computing device, such as transaction terminal 220 and/or multi-function transaction card 260, a digital wallet, and/or another device. In some implementations, transaction card 210 may communicate with transaction terminal 220 and/or multi-function transaction card 260 to complete a transaction (e.g., based on being moved within communicative proximity of transaction terminal 220 and/or multi-function transaction card 260).

Transaction terminal 220 includes one or more devices to facilitate processing a transaction via transaction card 210 and/or multi-function transaction card 260. Transaction terminal 220 may include a PoS terminal, a security access terminal, an ATM terminal, and/or the like. Transaction terminal 220 may include one or more input devices and/or output devices to facilitate obtaining transaction card data from transaction card 210 and/or multi-function transaction card 260, and/or interaction or authorization from a cardholder of transaction card 210 and/or multi-function transaction card 260. Example input devices of transaction terminal 220 may include a number keypad, a touchscreen, a magnetic stripe reader, a chip reader, and/or an RF signal reader. A magnetic stripe reader of transaction terminal 220 may receive transaction card data as a magnetic stripe of transaction card 210 and/or multi-function transaction card 260 is swiped along the magnetic stripe reader. A chip reader of transaction terminal 220 may receive transaction card data from an IC chip (e.g., an EMV chip) of transaction card 210 and/or multi-function transaction card 260 when the chip is placed in contact with the chip reader. An RF signal reader of transaction terminal 220 may enable contactless transactions from transaction card 210 and/or multi-function transaction card 260 by obtaining transaction card data wirelessly from transaction card 210 and/or multi-function transaction card 260 as transaction card 210 and/or multi-function transaction card 260 comes within a range of transaction terminal 220 at which the RF signal reader may detect an RF signal from an RF antenna of transaction card 210 and/or multi-function transaction card 260. Example output devices of transaction terminal 220 may include a display device, a speaker, a printer, and/or the like.

User device 230 includes one or more devices capable of receiving, generating, storing, processing, and/or providing information associated with transaction card 210 and/or multi-function transaction card 260. For example, user device 230 may include a communication device and/or a computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, user device 230 may include application logic capable of facilitating communications between transaction terminal 220 and multi-function transaction card 260.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 250 includes one or more devices associated with banks and/or transaction card associations that authorize transactions and/or facilitate a transfer of funds or payments between an account of a cardholder of transaction card 210 and/or multi-function transaction card 260 and an account of an individual or business of transaction terminal 220. For example, transaction backend 250 may include one or more devices of one or more issuing banks associated with a cardholder of transaction card 210 and/or multi-function transaction card 260, one or more devices of one or more acquiring banks (or merchant banks) associated with transaction terminal 220, and/or one or more devices associated with one or more card associations (e.g., VISA®, MASTERCARD®, and/or the like) associated with transaction card 210 and/or multi-function transaction card 260. Accordingly, in response to receiving transaction card data associated with transaction card 210 and/or multi-function transaction card 260 from transaction terminal 220, various banking institutions and/or card associations of transaction backend 250 may communicate to authorize the transaction and/or transfer funds between the accounts associated with transaction card 210, multi-function transaction card 260, and/or transaction terminal 220.

In some implementations, transaction backend 250 may include one or more devices associated with security that may provide or deny authorization associated with transactions. For example, transaction backend 250 may store and/or provide security access information that may or may not allow access through an access point (e.g., a gate, a door, and/or the like) of a secure location (e.g., a room, a building, an geographical area, a transportation terminal, and/or the like) based on information (e.g., account information, a key, an identifier, credentials, and/or the like) associated with transaction card 210 and/or multi-function transaction card 260 and/or provided by transaction terminal 220.

In some implementations, transaction backend 250 may include one or more devices associated with a rewards program relating to transaction card 210, multi-function transaction card 260, and/or an entity (e.g., a bank, a merchant, a service provider, a vendor, and/or the like) associated with transaction card 210, multi-function transaction card 260, and/or transaction terminal 220. For example, transaction backend 250 may authorize the earning and/or redemption of rewards (e.g., rewards points associated with transaction card 210 and/or multi-function transaction card 260, cash rewards, client loyalty rewards associated with an entity associated with transaction terminal 220, and/or the like) based on a transaction processed by transaction terminal 220 with transaction card 210 and/or multi-function transaction card 260.

Multi-function transaction card 260 includes a transaction card capable of storing and/or communicating data for a PoS transaction with transaction terminal 220, and capable of receiving and/or storing data for a PoS transaction with transaction card 210. For example, multi-function transaction card 260 may store or communicate data including account information (e.g., an account identifier, a cardholder identifier, etc.), expiration information of multi-function transaction card 260, banking information, transaction information (e.g., a payment token), and/or the like. For example, to store or communicate the data, multi-function transaction card 260 may include a magnetic stripe and/or an IC chip (e.g., an EMV chip and/or the like).

In some implementations, multi-function transaction card 260 may include a card body in or on which various components are embedded. In some implementations, multi-function transaction card 260 may include an antenna to communicate data associated with transaction terminal 220 and/or transaction card 210. The antenna may be a passive RF antenna, an active RF antenna, and/or a battery-assisted RF antenna. In some implementations, multi-function transaction card 260 may be a smart transaction card, capable of communicating wirelessly (e.g., via Bluetooth®, BLE, NFC, and/or the like) with a computing device, such as transaction terminal 220, transaction card 210, a digital wallet, and/or another device. In some implementations, multi-function transaction card 260 may communicate with transaction terminal 220, transaction card 210, and/or the like to complete a transaction (e.g., based on being moved within communicative proximity of transaction terminal 220, transaction card 210, and/or the like). In some implementations, multi-function transaction card 260 may include one or more components and/or one or more functionalities of transaction terminal 220 and/or one or more components and/or functionalities of transaction card 210.

Power bus 262 includes a component that permits the delivery of power to various components of multi-function transaction card 260. Bus 264 includes a component (e.g., a serial communication bus, such as a serial peripheral interface (SPI) bus, a universal asynchronous receiver-transmitter (UART)-based bus, a bus based on the inter-integrated circuit (I2C) protocol, and/or the like) that permits communication among various components of multi-function transaction card 260. RF/NFC 266 may include a communication link that permits data delivery between secure element 274, NFC antenna 276, and NFC front end 278.

Power source 268 includes one or more devices, internal to multi-function transaction card 260, capable of supplying power. For example, power source 268 may include a battery (e.g., a rechargeable battery, a non-rechargeable battery, and/or the like), a power supply, a capacitor (e.g., a supercapacitor, an ultracapacitor, and/or the like), and/or the like. In some implementations, multi-function transaction card 260 (e.g., controller 272, secure element 274, and/or NFC front end 278) may obtain power from power source 268 when multi-function transaction card 260 is to perform a transaction. In some aspects, multi-function transaction card 260 may include a single power source 268, which may supply power for performing a transaction and/or may supply power to one or more other components of multi-function transaction card 260 (e.g., a processor, a storage component, an input component, an output component, a communication interface, and/or the like). In some aspects, multi-function transaction card 260 may include multiple power sources 268. In some aspects, a single power source 268 may be dedicated to supplying power solely for performing a transaction, while other power sources 268 may supply power to other components of multi-function transaction card 260. In some implementations, multi-function transaction card 260 may include one or more solar cells and associated circuitry that enable various components of multi-function transaction card 260 to be powered by solar energy.

Power management component 270 includes one or more devices capable of controlling the delivery of power to various components of multi-function transaction card 260 and/or controlling charging of power source 268. For example, power management component 270 may include a switch, a gate, a controller, a regulator, a processing component, and/or the like. In some implementations, power management component 270 may include a bidirectional logic level shifter to control signals between controller 272 and secure element 274 (e.g., to couple or decouple controller 272 and secure element 274, to prevent signals from being passed between controller 272 and secure element 274, and/or the like). Additionally, or alternatively, power management component 270 may include a diode (e.g., an ideal diode) and/or a switch (e.g., a load switch) to control signals between power source 268 and secure element 274 (e.g., to couple or decouple power source 268 and secure element 274, to prevent signals from being passed between power source 268 and secure element 274, and/or the like).

Controller 272 includes one or more devices capable of receiving, generating, storing, processing, and/or providing information and/or instructions that assist with performing a transaction. For example, controller 272 may include a processor, such as processor 320 described below in connection with FIG. 3. Additionally, or alternatively, controller 272 may include memory, such as memory 330 described below in connection with FIG. 3. In some implementations, controller 272 may be directly, communicatively coupled to secure element 274 (e.g., via a dedicated, single-wire communication link).

Secure element 274 includes one or more devices capable of securely hosting an operating system and/or an application, and/or storing confidential information (e.g., a credential, cryptographic information, and/or the like). For example, secure element 274 may include a universal integrated circuit card (UICC), a secure digital (SD) card (e.g., a microSD card and/or the like), an embedded secure element, and/or the like. In some implementations, secure element 274 may include a tamper resistant hardware platform. In some implementations, secure element 274 may include one or more processors (e.g., one or more microcontrollers) certified by a standard body group, such as an EMV Consortium (EMVCo) certified (e.g., 16-bit and/or the like) secure microcontroller.

In some implementations, secure element 274 may host a personalized card application and a cryptographic key required to perform a financial transaction (e.g., with transaction terminal 220). In some implementations, secure element 274 may receive a cryptographic key required to perform a financial transaction (e.g., with transaction card 210), as described elsewhere herein. In some implementations, secure element 274 may store a credential associated with multi-function transaction card 260, such as a username, a password, biometric information, a token, a certificate for signing documents, and/or the like. In some implementations, secure element 274 may store a credential (e.g., a username, a password, biometric information, a token, a certificate for signing documents, and/or the like) associated with another transaction card (e.g., transaction card 210), as described elsewhere herein.

In some implementations, secure element 274 may include application logic configured to communicate with NFC front end 278 (e.g., to cause NFC front end 278 to provide card data from secure element 274 to transaction terminal 220 to submit a payment, to cause NFC front end 278 to receive card data from another transaction card (e.g., transaction card 210) to process a payment, and/or the like). In some implementations, secure element 274 may include application logic configured to communicate with controller 272 (e.g., to cause controller 272 to communicate with a user device (e.g., user device 230) to facilitate online data authentication relating to a transaction (e.g., with transaction card 210), to receive instructions from controller 272 to initiate transaction processing (e.g., associated with transaction card 210), and/or the like). In some implementations, secure element 274 may include application logic configured to receive inputs from input device 280 (e.g., directly or via controller 272), to provide outputs to output device 282 (e.g., directly or via controller 272), and/or the like.

NFC antenna 276 includes an antenna capable of transmitting and/or receiving information using an NFC protocol. For example, NFC antenna 276 may include a loop antenna (e.g., an NFC loop antenna), an inductor (e.g., an NFC inductor), and/or the like. In some implementations, NFC antenna 276 may be integrated into, or with, secure element 274 and/or NFC front end 278 (e.g., may be part of the same integrated circuit, such as a transaction IC).

NFC front end 278 includes one or more devices capable of communicating with external devices, such as transaction card 210 and/or transaction terminal 220, using an NFC protocol. NFC front end 278 may be communicatively coupled to secure element 274 and configured to obtain card data from secure element 274 and provide the card data to transaction terminal 220, as described elsewhere herein. In some implementations, NFC front end 278 may be configured to receive card data from transaction card 210 and provide the card data to secure element 274 for processing, as described elsewhere herein.

NFC front end 278 may include one or more radio modules for receiving and/or emitting NFC signals. NFC front end 278 may include one or more processors (e.g., microprocessor(s), microcontroller(s), and/or the like) and/or be coupled to one or more processors, such as controller 272, processor(s) included in secure element 274, and/or the like.

Although not shown, in some implementations, multi-function transaction card 260 may include a transaction IC that includes an integrated circuit connecting secure element 274, NFC antenna 276, and/or one or more other components of multi-function transaction card 260. For example, the transaction IC may include secure element 274, NFC antenna 276, NFC front end 278, connection(s) between secure element 274, NFC antenna 276, and NFC front end 278, and/or the like.

Input device 280 includes one or more components that permit multi-function transaction card 260 to receive information, such as via user input (e.g., to initiate a transaction, such as to receive card data from transaction card 210). For example, input device 280 may include an input component, such as input component 350 described below in connection with FIG. 3. For example, input device 280 may include an accelerometer, pushbutton(s), touch sensor(s), keypad input(s), and/or the like.

Output device 282 includes one or more components that permit multi-function transaction card 260 to provide output information (e.g., relating to transaction processing associated with transaction card 210 and/or transaction terminal 220). For example, output device 282 may include an output component, such as output component 360 described below in connection with FIG. 3. For example, output device 282 may include dot matrix display(s), one or more LEDs (e.g., printed organic LEDs), and/or the like.

Communication device 284 includes a transceiver-like component that enables multi-function transaction card 260 to communicate with other devices. For example, communication device 284 may include a communication interface, such as communication interface 370 described below in connection with FIG. 3. In some implementations, communication device 284 may include a Bluetooth® communication interface, a BLE communication interface, and/or the like. In some implementations, communication device 284 may be included in, or integrated with, controller 272.

Accelerometer 286 includes a component capable of measuring acceleration. Accelerometer 286 may be used to measure a movement of multi-function transaction card 260, to determine whether multi-function transaction card 260 is in motion or at rest, to measure a speed and/or acceleration of the motion of multi-function transaction card 260, and/or to measure an orientation of multi-function transaction card 260.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
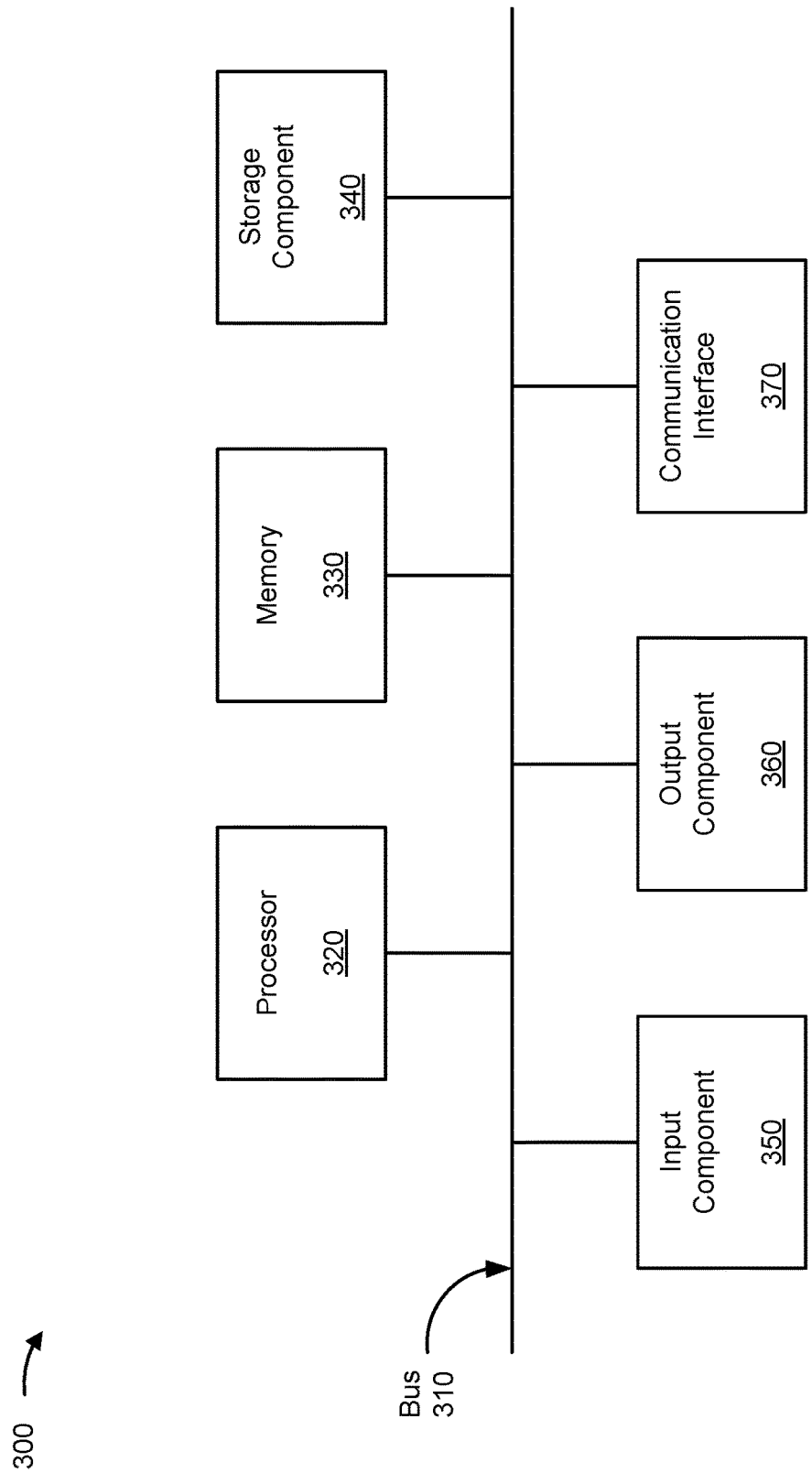
FIG. 3 is a diagram of example components of one or more devices of FIG. 2.

FIG. 3 is a diagram of example components of a device 300. Device 300 may correspond to transaction card 210, transaction terminal 220, user device 230, transaction backend 250, and/or multi-function transaction card 260. In some implementations, transaction card 210, transaction terminal 220, user device 230, transaction backend 250, and/or multi-function transaction card 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RANI), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for systems and methods for providing power to a multi-purpose transaction card. In some implementations, one or more process blocks of FIG. 4 may be performed by a transaction card (e.g., transaction card 210 and/or multi-function transaction card 260). In some implementations, one or more process blocks of FIG. 4 may be performed by another device or a group of devices separate from or including the transaction card, such as a transaction terminal (e.g., transaction terminal 220), a user device (e.g., user device 230), a transaction backend (e.g., transaction backend 250), and/or the like.

As shown in FIG. 4, process 400 may include causing the transaction card to be in a first state, wherein the transaction card includes a battery and at least one other component, and wherein the battery does not provide power to the at least one other component when the transaction card is in the first state (block 410). For example, the multi-function transaction card (e.g., using processor 320, memory 330, storage component 340, input component 350, output component 360, communication interface 370, and/or the like) may cause the multi-function transaction card to be in a first state, as described above. In some implementations, the multi-function transaction card includes a battery and at least one other component. In some implementations, the battery does not provide power to the at least one other component when the multi-function transaction card is in the first state.

As further shown in FIG. 4, process 400 may include receiving a signal from a near-field communication (NFC) device (block 420). For example, the multi-function transaction card (e.g., using processor 320, memory 330, storage component 340, input component 350, output component 360, communication interface 370, and/or the like) may receive a signal from a near-field communication (NFC) field generator, as described above.

As further shown in FIG. 4, process 400 may include causing the transaction card to be in a second state based on receiving the signal, wherein the battery provides power to the at least one other component when the transaction card is in the second state (block 430). For example, the multi-function transaction card (e.g., using processor 320, memory 330, storage component 340, input component 350, output component 360, communication interface 370, and/or the like) may cause the multi-function transaction card to be in a second state based on receiving the signal, as described above. In some implementations, the battery provides power to the at least one other component when the multi-function transaction card is in the second state.

As further shown in FIG. 4, process 400 may include performing a transaction based on the transaction card being in the second state (block 440). For example, the multi-function transaction card (e.g., using processor 320, memory 330, storage component 340, input component 350, output component 360, communication interface 370, and/or the like) may perform a transaction based on the multi-function transaction card being in the second state, as described above.

Process 400 may include additional implementations, such as any single implementation or any combination of implementations described below and/or in connection with one or more other processes described elsewhere herein.

In a first implementation, process 400 includes determining that a time period has elapsed, wherein a start of the time period corresponds to a time at which the transaction card entered the second state; and causing the transaction card to enter the first state based on the time period having elapsed. For example, the multi-function transaction card may determine that a time period has elapsed, wherein a start of the time period corresponds to a time at which the multi-function transaction card entered the second state; and causing the multi-function transaction card to enter the first state based on the time period having elapsed, as described above.

In a second implementation, alone or in combination with the first implementation, causing the transaction card to enter the second state comprises: transmitting a hardware interrupt signal to at least one of the battery or the at least one other component. For example, the multi-function transaction card, when causing the multi-function transaction card to enter the second state, may transmit a hardware interrupt signal to at least one of the battery or the at least one other component, as described above.

In a third implementation, alone or in combination with one or more of the first and second implementations, the signal received from the NFC device comprises a first signal; causing the transaction card to enter the second state comprises: causing the transaction card to enter the second state for a time period, and the method further comprises: receiving a second signal from the NFC device, the second signal indicates that the transaction card is not to enter the second state when the time period elapses; determining that the time period has elapsed; and causing the transaction card to remain in the first state based on the second signal. For example, the multi-function transaction card, when causing the multi-function transaction card to enter the second state, may cause the multi-function transaction card to enter the second state for a time period. The multi-function transaction card may further receive a second signal from the NFC field generator indicating that the multi-function is not to enter the second state when the time period elapses, may determine that the time period has elapsed, and may cause the multi-function transaction card to remain in the first state based on the second signal, as described above.

In a fourth implementation, alone or in combination with one or more of the first through third implementations, process 400 includes receiving a third signal from the NFC device; and causing the transaction card to enter the second state based on the third signal. For example, the multi-function transaction card may receive a third signal from the NFC field generator and may cause the transaction card to enter the second state based on the third signal, as described above.

In a fifth implementation, alone or in combination with one or more of the first through fourth implementations, the at least one other component includes an accelerometer, the method further comprising: receiving a user input; causing the battery to provide power to the accelerometer based on the user input; receiving data indicative of a movement of the transaction card from the accelerometer, and causing the transaction card to enter the second state based on the data. For example, the multi-function transaction card may include an accelerometer. The multi-function transaction card may receive a user input, may cause the battery to provide power to the accelerometer based on the user input, may receive data indicative of a movement of the multi-function transaction card from the accelerometer, and may cause the multi-function transaction card to enter the second state based on the data, as described above.

In a sixth implementation, alone or in combination with one or more of the first through fifth implementations, the at least one other component includes an accelerometer, the method further comprising: receiving data from the accelerometer; detecting a performance of a movement of the transaction card based on the data, and causing the transaction card to enter the second state based on detecting the movement. For example, the multi-function transaction card may include an accelerometer. The multi-function transaction card may receive data from the accelerometer; may detect a performance of a movement of the multi-function transaction card based on the data and may cause the multi-function transaction card to enter the second state based on detecting the movement, as described above.

In a seventh implementation, alone or in combination with one or more of the first through sixth implementations, process 400 includes determining that a predetermined time period has elapsed; and causing the power source to stop providing power to a set of components based on the predetermined time period having elapsed. For example, one or more processors of the multi-function transaction card may determine that a predetermined time period has elapsed and may cause the power source to stop providing power to a set of components of the multi-function transaction card based on the predetermined time period having elapsed, as described above.

In an eighth implementation, alone or in combination with one or more of the first through seventh implementations, process 400 includes determining that the transaction card is performing an update operation; determining that the predetermined time period has elapsed; and causing the power source to continue providing power to the set of components based on the transaction card performing the update operation. For example, the multi-function transaction card may determine that the multi-function transaction card is performing an update operation, may determine that the predetermined time period has elapsed, and may cause the power source to continue providing power to the set of components based on the transaction card performing the update operation, as described above.

In a ninth implementation, alone or in combination with one or more of the first through eighth implementations, process 400 includes, when determining that the transaction card is performing an update operation, receiving a second signal from the NFC device, and determining that the transaction card is performing the update operation based on the second signal. For example, the multi-function transaction card, when determining that the multi-function card is performing an update operation, may receive a second signal from the user device and may determine that the multi-function transaction card is performing the update operation based on the second signal, as described above.

In a tenth implementation, alone or in combination with one or more of the first through ninth implementations, process 400 includes determining that the transaction card has completed an update operation; and causing the power source to stop providing power to a set of components based on determining that the transaction card has completed the update operation. For example, the multi-function transaction card may determine that the multi-function transaction card has completed an update operation and may cause the power source to stop providing power to a set of components of the multi-function transaction card based on determining that the multi-function transaction card has completed the update operation, as described above.

In some implementations, determining that the transaction card has completed an update operation includes receiving a second signal from the NFC device and determining that the transaction card has completed the update operation based on the second signal. For example, the multi-function transaction card, when determining that the multi-function transaction card has completed the update operation, may receive a second signal from the user device and may determine that the multi-function transaction card has completed the update operation based on the second signal, as described above.

In an eleventh implementation, alone or in combination with one or more of the first through tenth implementations, process 400 includes receiving, prior to a predetermined period having elapsed, a second signal from the NFC device; and causing the power source to stop providing power to a set of components of the transaction device prior to the predetermined time period having elapsed based on the second signal. For example, the multi-function transaction card may receive, prior to a predetermined time period having elapsed, a second signal from the user device and may cause the power source to stop providing power to a set of components of the multi-function transaction card prior to the predetermined period having elapsed based on the second signal, as described above.

In a twelfth implementation, alone or in combination with one or more of the first through eleventh implementations, process 400 includes receiving, when the transaction card is in the second state and prior to an expiration of a predetermined time period, an input from a user of the transaction card; and causing the transaction card to be in the first state prior to the expiration of the predetermined time period based on the input. For example, the multi-function transaction card may receive, when the multi-function transaction card is in the second state and prior to an expiration of a predetermined time period, an input from a user of the multi-function transaction card. The multi-function transaction card may cause the multi-function transaction card to be in the first state prior to the expiration of the predetermined time period based on the input, as described above.

In a thirteenth implementation, alone or in combination with one or more of the first through twelfth implementations, the power source includes a rechargeable battery and process 400 includes harvesting energy from a first signal and utilizing the harvested energy to recharge the rechargeable battery. For example, the multi-function transaction card may include a rechargeable battery and may harvest energy from a signal transmitted by the NFC field generator. The multi-function transaction card may utilize the harvested energy to recharge the rechargeable battery, as described above.

In a fourteenth implementation, alone or in combination with one or more of the first through thirteenth implementations, process 400 may include determining that an input device, included on the transaction card, is in a first position; causing the power source to provide power to an accelerometer associated with the transaction card based on the input device being in the first position; determining, based on data received from the accelerometer, that the transaction card has moved from a first position to a second position; and causing the transaction card to be in the first state based on the transaction card having moved from the first position to the second position. For example, the multi-function transaction card may determine that an input device, included on the multi-function transaction card, is in a first position; cause the power source to provide power to an accelerometer associated with the multi-function transaction card based on the input device being in the first position; determine, based on data received from the accelerometer, that the multi-function transaction card has moved from a first position to a second position; and cause the multi-function transaction card to be in the first state based on the multi-function transaction card having moved from the first position to the second position, as described above.

In a fifteenth implementation, alone or in combination with one or more of the first through fourteenth implementations, process 400 may include causing the transaction card to enter the first state upon an expiration of a time period; receiving an input from a user; and causing the transaction card to enter the second state based on receiving the input from the user. For example, the multi-function transaction card may cause the multi-function transaction card to enter the first state upon an expiration of a time period. The multi-function transaction card may receive an input from a user and may cause the multi-function transaction card to enter the second state based on receiving the input from the user, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   harvesting, by a device that is in a first state, energy from a first signal including data,
      wherein the first signal is received from a wireless device, and
      wherein the device includes a power source that does not provide power to another component of the device when the device is in the first state;
   transmitting, by the device and based on the harvested energy, a second signal to the power source;
   causing, by the device and based on the second signal, the device to be in a second state,
      wherein the power source provides power to the other component when the device is in the second state; and
   performing, by the device and based on the device being in the second state, one or more operations.

2. The method of claim 1, wherein the one or more operations include at least one of:
   transferring user data from the wireless device to the device,
   updating an application stored on the device, or
   synchronizing data between the device and the wireless device.

3. The method of claim 1, further comprising:
   determining a set of conditions for causing the device to be in the first state,
      wherein the set of conditions are associated with at least one of:
         conducting a transaction,
         detecting an expiration of a time period, or
         performing an update operation; and
   causing the device to be in the first state when a particular condition of the set of conditions is satisfied.

4. The method of claim 1, wherein the one or more operations include conducting a transaction; and
   the method further comprising:
      causing the device to be in the first state when information indicating that the transaction has been successfully conducted is received.

5. The method of claim 1, further comprising:
   causing the device to be in the first state after an expiration of a time period,
      wherein the time period starts at a time that the device enters the second state.

6. The method of claim 1, wherein a time period starts at a time that the device enters the second state,
   wherein an expiration of the time period is associated with causing the device to be in the first state, and
   wherein the method further comprises:
      determining that information indicating that a transaction has been successfully conducted is not received until the expiration of the time period; and
      maintaining, based on determining that information indicating that the transaction has been successfully conducted is not received until the expiration of the time period, the device in the second state after the expiration of the time period.

7. The method of claim 1, wherein the one or more operations include conducting a transaction.

8. A device, comprising:
   one or more memories; and
   one or more processors, coupled to the one or more memories, configured to:
      harvest, based on the device being in a first state, energy from a first signal,
         wherein the first signal is received from a wireless device, and
         wherein the device includes a power source that does not provide power to another component of the device when the device is in the first state;
      transmit, based on utilizing the harvested energy, a second signal to the power source;
      cause, based on the second signal, the device to be in a second state,
         wherein the power source provides power to the other component when the device is in the second state; and
      perform, based on the device being in the second state, one or more operations.

9. The device of claim 8, wherein the one or more operations include at least one of:
   transferring user data from the wireless device to the device,
   updating an application stored on the device, or
   synchronizing data between the device and the wireless device.

10. The device of claim 8, wherein the one or more processors are further configured to:
    determine a set of conditions for causing the device to be in the first state,
       wherein the set of conditions are associated with at least one of:
          conducting a transaction,
          detecting an expiration of a time period, or
          performing an update operation; and
    cause the device to be in the first state when a particular condition of the set of conditions is satisfied.

11. The device of claim 8, wherein the one or more operations include conducting a transaction; and
    wherein the one or more processors are further configured to:

cause the device to be in the first state when information indicating that the transaction has been successfully conducted is received.

12. The device of claim 8, wherein the one or more processors are further configured to:
cause the device to be in the first state after an expiration of a time period,
wherein the time period starts at a time that the device enters the second state.

13. The device of claim 8, wherein a time period starts at a time that the device enters the second state,
wherein an expiration of the time period is associated with causing the device to be in the first state,
wherein the one or more processors are further configured to:
determine that information indicating that a transaction has been successfully conducted is not received until the expiration of the time period; and
maintain, based on determining that information indicating that the transaction has been successfully conducted is not received until the expiration of the time period, the device in the second state after the expiration of the time period.

14. The device of claim 8, wherein the one or more operations include conducting a transaction.

15. A non-transitory computer-readable medium storing a set of instructions, the set of instructions comprising:
one or more instructions that, when executed by one or more processors of a device, cause the device to:
harvest energy, based on the device being in a first state, from a first signal,
wherein the first signal is received from a wireless device, and
wherein the device includes a power source that does not provide power to another component of the device when the device is in the first state;
transmit, based on the harvested energy, a second signal to the power source;
cause, based on the second signal, the device to be in a second state,
wherein the power source provides power to the other component when the device is in the second state; and
perform, based on the device being in the second state, one or more operations.

16. The non-transitory computer-readable medium of claim 15, wherein the one or more instructions further cause the device to:
transfer user data from the wireless device to the device, update an application stored on the device, or
synchronize data between the device and the wireless device.

17. The non-transitory computer-readable medium of claim 15, wherein the one or more instructions further cause the device to:
determine a set of conditions for causing the device to be in the first state,
wherein the set of conditions are associated with at least one of:
conducting a transaction,
detecting an expiration of a time period, or
performing an update operation; and
cause the device to be in the first state when a particular condition of the set of conditions is satisfied.

18. The non-transitory computer-readable medium of claim 15, wherein the one or more instructions further cause the device to conduct a transaction; and
wherein the one or more instructions further cause the device to:
cause the device to be in the first state when information indicating that the transaction has been successfully conducted is received.

19. The non-transitory computer-readable medium of claim 15, wherein the one or more instructions further cause the device to:
cause the device to be in the first state after an expiration of a time period,
wherein the time period starts at a time that the device enters the second state.

20. The non-transitory computer-readable medium of claim 15, wherein a time period starts at a time that the device enters the second state,
wherein an expiration of the time period is associated with causing the device to be in the first state, and
wherein the one or more instructions further cause the device to:
determine that information indicating that a transaction has been successfully conducted is not received until the expiration of the time period; and
maintain, based on determining that information indicating that the transaction has been successfully conducted is not received until the expiration of the time period, the device in the second state after the expiration of the time period.

\* \* \* \* \*